W. J. A. LONDON.
PACKING.
APPLICATION FILED SEPT. 13, 1917.
1,316,964.
Patented Sept. 23, 1919.
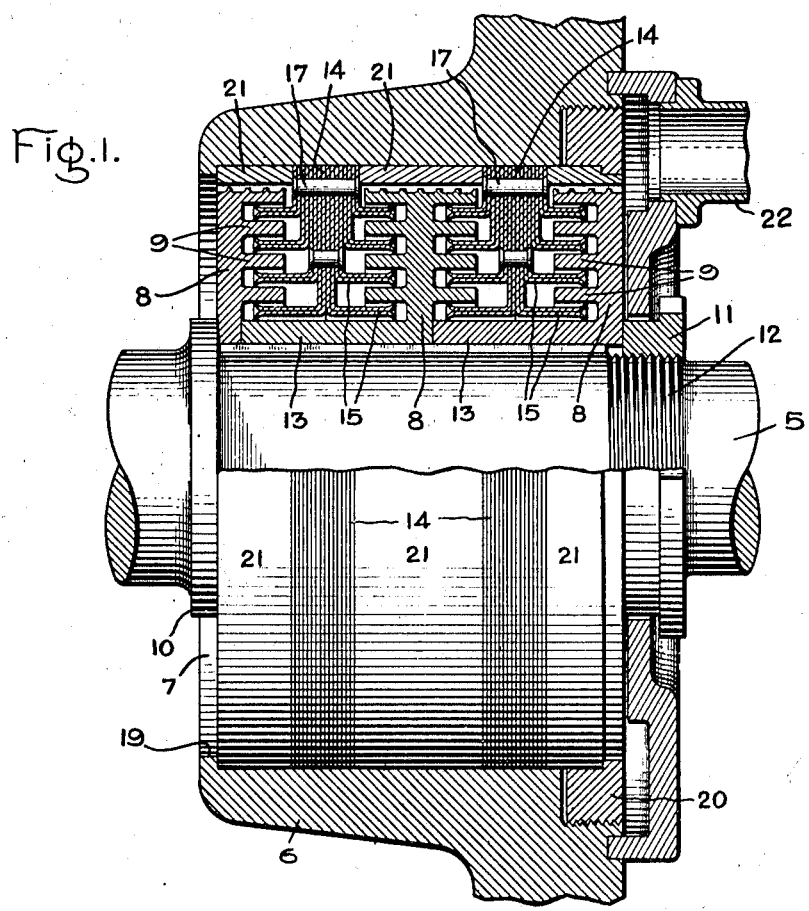
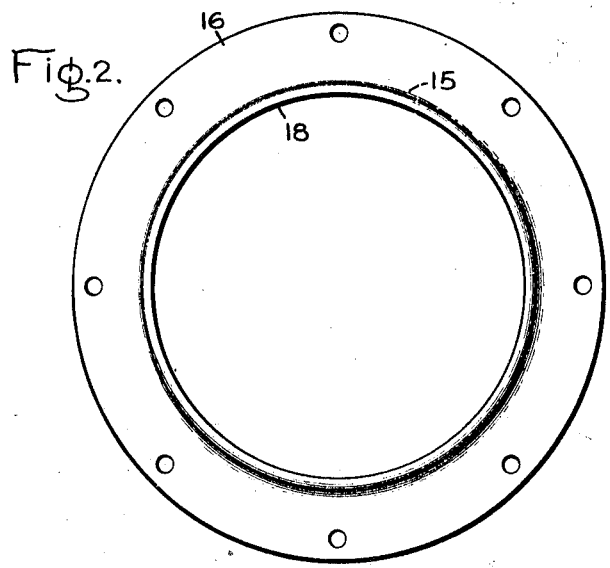
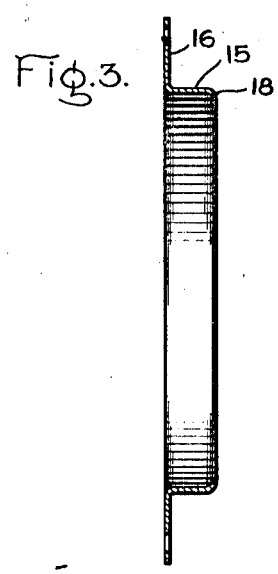
Inventor:
William J. A. London,
by Albert G. Davis
His Attorney.

UNITED STATES PATENT OFFICE.

WILLIAM J. A. LONDON, OF SPRINGFIELD, MASSACHUSETTS, ASSIGNOR TO GENERAL ELECTRIC COMPANY, A CORPORATION OF NEW YORK.

PACKING.

1,316,964.      Specification of Letters Patent.    Patented Sept. 23, 1919.

Application filed September 13, 1917. Serial No. 191,146.

*To all whom it may concern:*

Be it known that I, WILLIAM J. A. LONDON, a subject of the King of Great Britain, residing at Springfield, county of Hampden, in the State of Massachusetts, have invented certain new and useful Improvements in Packings, of which the following is a specification.

The present invention relates to packings of the labyrinth type which comprise a plurality of interleaving rings forming a tortuous passage to baffle the flow of the fluid, the leakage of which it is desired to prevent.

The object of the invention is to provide an improved packing structure which, while being efficient in operation, will be cheap and simple to construct.

For a consideration of what I believe to be novel and my invention, attention is directed to the accompanying specification and the claims appended thereto.

In the drawing, Figure 1 is a view partly in section illustrating my invention; Fig. 2 is an elevation of a packing element, and Fig. 3 is a section of a packing element as shown in Fig. 2.

Referring to the drawing, 5 indicates a rotating shaft which may be, for example, the shaft of an elastic fluid turbine, and 6 indicates a stationary member having an opening 7 through which the shaft projects and between which and the shaft it is desired to prevent leakage. The member 6 may, for example, be a part of the casing of an elastic fluid turbine. Carried by the shaft 5 are a number of collars 8 from which project spaced concentric rings 9. In the present instance three collars 8 are shown, the central one having rings 9 on each side thereof. It will be understood, however, that any suitable number may be utilized. The collars 8 are held between a flange 10 on the shaft and a nut 11 which screws over a threaded portion 12 thereon, and are spaced apart by sleeves 13 which may be formed integral with the collars.

Carried by the stationary member 6 are one or more packing structures 14, each comprising a plurality of rings 15 which coöperate with the rings 9. The packing structure 14 is formed of a plurality of packing elements, as shown in Figs. 2 and 3, each comprising a ring 15 carried by a flange 16. The rings are of varying diameter and the packing structure 14 is formed by assembling the packing elements with their flanges 16 in contact and then riveting them together as indicated at 17 in Fig. 1. Each ring 15 is preferably formed with a sharpened in-turned or out-turned edge 18 which, when the packing is assembled, makes a close clearance with a surface of a ring 9. As these edges are thin, they will quickly wear away in case of contact with the adjacent ring 9. The rings 15 will also possess a certain amount of flexibility which is desirable. The packing structures 14 are held in place between an annular shoulder 19 and a locking ring 20, and are spaced apart by suitable spacing members 21. 22 indicates a conduit through which any leakage through the packing may escape. This conduit may lead to any suitable point.

The above described structure has the advantage that the packing elements which comprise rings 15 and flanges 16 may be formed by stamping them from sheet material, after which they are easily assembled and fastened together. Only the stationary portion of the packing is shown as being formed from stampings, but it will, of course, be understood that if desired the rotating portion may be so formed also.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is:

1. A packing comprising a plurality of interleaving concentric rings, at least one set of said rings being formed of sheet material and being provided with flanges which are fastened together to form a supporting member from which said rings project in spaced concentric relation.

2. A packing structure comprising a plurality of spaced concentric rings each having an integral flange which extends at right angles thereto, said flanges being in contact with each other and fastened together to form a supporting member for carrying said rings.

3. A packing structure comprising a plurality of thin rings stamped from sheet material and each provided with an integral flange, said flanges being placed against each other and fastened together to form a supporting member from which said rings project in spaced relation.

4. A packing structure comprising a plurality of thin rings stamped from sheet material and each provided with an integral flange, said flanges being placed against each other and fastened together to form a supporting member from which said rings project in spaced relation, the edges of said rings being turned at an angle to the rings and sharpened.

5. A packing structure comprising a plurality of thin rings stamped from sheet material and each provided with an integral flange, said flanges being placed against each other, and fastened together to form a supporting member from both sides of which said rings project in spaced concentric relation.

6. A packing structure comprising a plurality of thin rings stamped from sheet material and each provided with an integral flange, said flanges being of different lengths and placed against each other with their peripheries flush so that said rings are in spaced relation to each other, and means for fastening said flanges together.

7. In a packing, the combination of a plurality of spaced concentric rings, and a packing structure having rings which project between said spaced rings and have turned sharpened edges which pack against the surfaces thereof, said second named rings being formed from sheet material and provided with flanges which engage each other and are fastened together to form such packing structure.

In witness whereof, I have hereunto set my hand this tenth day of September, 1917.

WILLIAM J. A. LONDON.